(12) United States Patent
Li et al.

(10) Patent No.: US 11,941,434 B2
(45) Date of Patent: Mar. 26, 2024

(54) TASK PROCESSING METHOD, PROCESSING APPARATUS, AND COMPUTER SYSTEM

(71) Applicant: Huawei Technologies Co., Ltd., Shenzhen (CN)

(72) Inventors: Wei Li, Shanghai (CN); Xiong Gao, Hangzhou (CN); Hou Fun Lam, Hong Kong (CN); Tao Ma, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 602 days.

(21) Appl. No.: 17/097,211

(22) Filed: Nov. 13, 2020

(65) Prior Publication Data

US 2021/0064425 A1 Mar. 4, 2021

Related U.S. Application Data

(63) Continuation of application No. PCT/CN2019/070720, filed on Jan. 7, 2019.

(30) Foreign Application Priority Data

May 15, 2018 (CN) .......................... 201810463722.9

(51) Int. Cl.
*G06F 9/48* (2006.01)
*G06F 9/38* (2018.01)

(52) U.S. Cl.
CPC .......... *G06F 9/4881* (2013.01); *G06F 9/3838* (2013.01)

(58) Field of Classification Search
CPC ............................. G06F 9/4881; G06F 9/3838
See application file for complete search history.

(56) References Cited

U.S. PATENT DOCUMENTS

2001/0053957 A1\* 12/2001 Blair ...................... G16B 30/10
702/19
2013/0103977 A1\* 4/2013 Zimmermann ..... G06F 11/2046
714/4.11
2013/0305258 A1 11/2013 Durant

FOREIGN PATENT DOCUMENTS

| CN | 101470626 A | 7/2009 |
| CN | 102508704 A | 6/2012 |

(Continued)

OTHER PUBLICATIONS

Peng, Hao et al., "A Gb/s Parallel Block-based Viterbi Decoder for Convolutional Codes on Gpu", IEEE 8th International Conference on Wireless Communications & Signal Processing (WCSP), Oct. 13-15, 2016, 6 pages, XP033002111.

(Continued)

*Primary Examiner* — Wissam Rashid
(74) *Attorney, Agent, or Firm* — Slater Matsil, LLP

(57) ABSTRACT

A task processing method, a processing apparatus, and a computer system are provided. Implementation of the method includes: generating, by a first processing apparatus, a plurality of tasks, and determining task description information of the plurality of tasks, where the task description information of the plurality of tasks is used to indicate a dependency relationship between the plurality of tasks; sending an instruction to a second processing apparatus, where the instruction includes the plurality of tasks and the task description information of the plurality of tasks; and receiving the instruction, and processing the plurality of tasks based on the dependency relationship between the plurality of tasks. The method can effectively reduce a waiting delay, fully exploit a computing capability of an acceleration chip, and improve task processing efficiency.

17 Claims, 7 Drawing Sheets

(56) References Cited

FOREIGN PATENT DOCUMENTS

| | | |
|---|---|---|
| CN | 104484167 A | 4/2015 |
| CN | 105162878 A | 12/2015 |
| CN | 106874084 A | 6/2017 |
| CN | 107665233 A | 2/2018 |

OTHER PUBLICATIONS

NVIDIA, "CUDA C Programming Guide", Design Guide, PG 02829 001_v7.5, Sep. 2015, 261 pages, XP055537201.

* cited by examiner

TASK PROCESSING METHOD, PROCESSING APPARATUS, AND COMPUTER SYSTEM

CROSS-REFERENCE TO RELATED APPLICATIONS

This application is a continuation of International Application No. PCT/CN2019/070720, filed on Jan. 7, 2019, which claims priority to Chinese Patent Application No. 201810463722.9, filed on May 15, 2018, all of which applications are hereby incorporated herein by reference.

TECHNICAL FIELD

This application relates to the field of computer technologies, and in particular, to a task processing method, a processing apparatus, and a computer system.

BACKGROUND

Nowadays, with the rapid development of the information industry, computing requirements are increasingly diversified, and computing performance of a computer is constantly improved and has evolved from homogeneous computing to present heterogeneous computing. In heterogeneous computing, a processor other than a central processing unit (CPU) is used to complete a computing task. Different computing tasks may be completed by using different processors, for example, a digital signal processor (DSP), a graphics processing unit (GPU), a field programmable gate array (FPGA), and neural processing unit (NPU) that has emerged in recent years. The NPU serves artificial intelligence (AI) computing, specializes in massive matrix multiplication, and can efficiently complete convolution computing in a neural network. Because heterogeneous computing uses a multi-core parallel processing architecture, a computing time is required to be extremely short, and therefore a higher requirement is imposed on task scheduling efficiency.

Currently, mainstream heterogeneous computing uses a host-device model. A host asynchronously distributes computing tasks and related (input/output) data moving tasks to a device, and then the device completes computation and data migration. When distributing a task to the device, the host needs to ensure that all prerequisites on which the task depends are satisfied (for example, all tasks on which the task depends have been processed) before distributing the task. A task that does not have a dependency relationship may be randomly sent. Specifically, the host generates a plurality of tasks based on invocation of an application program, places the plurality of tasks in different queues, and then obtains a task from the queues and sends the task to the device. The host sends a next task after receiving a processing result returned by the device.

However, due to a multi-layer data dependency feature between AI computing tasks, after processing a current task, the device needs to re-notify, through a high-latency host-device line, the host to obtain a subsequent task. This increases a waiting delay of the task and stalls computing of the device, and consequently, a computing capability of an acceleration chip cannot be fully exploited.

SUMMARY

This application provides a task processing method, a processing apparatus, and a computer system, to resolve a problem that a waiting delay of a task is relatively large and a computing capability of an acceleration chip cannot be fully exploited.

According to a first aspect, an embodiment of this application provides a task processing method, including:

generating, by a first processing apparatus, a plurality of tasks, and determining task description information of the plurality of tasks, where the task description information of the plurality of tasks is used to indicate a dependency relationship between the plurality of tasks, and in any two tasks that have a dependency relationship, processing of one task needs to wait for a processing result of the other task; and sending, by the first processing apparatus, an instruction to a second processing apparatus, where the instruction includes the plurality of tasks and the task description information of the plurality of tasks.

In this embodiment of this application, the first processing apparatus sends the plurality of tasks and the task description information of the plurality of tasks to the second processing apparatus together. In this way, after processing one task, the second processing apparatus may directly obtain, based on the dependency relationship between the plurality of tasks, a next task for processing. Compared with that in the prior art in which the second processing apparatus needs to notify the first processing apparatus after processing a task, and the first processing apparatus delivers a next task, the solution in this embodiment of this application can effectively reduce a waiting delay, fully exploit a computing capability of an acceleration chip, and improve task processing efficiency. In addition, processing load of the first processing apparatus can be reduced, thereby implementing load balancing between the first processing apparatus and the second processing apparatus in a future scenario in which a computing capability of the second processing apparatus is expanded, better balancing a computing capability and a data moving capacity, and improving overall performance in an AI scenario with an increased computing capability of a chip, a high data throughput, and a multi-layer data dependency feature.

In a possible design, the task description information includes identifiers of task streams corresponding to the plurality of tasks.

The first processing apparatus determines the task streams corresponding to the plurality of tasks in the following manner:

if the first processing apparatus determines that a quantity of resources of idle task streams is greater than or equal to a first threshold, allocating corresponding task streams in the idle task streams to the plurality of tasks; if the first processing apparatus determines that a quantity of resources of idle task streams is less than or equal to a second threshold, allocating corresponding task streams in existing task streams on the second processing apparatus to the plurality of tasks; or if the first processing apparatus determines that a quantity of resources of idle task streams is greater than a second threshold and less than a first threshold, allocating corresponding task streams in the idle task streams to some of the plurality of tasks, and allocating corresponding task streams in existing task streams on the second processing apparatus to the other tasks of the plurality of tasks.

In this way, when determining the identifiers of the task streams corresponding to the plurality of tasks, the first processing apparatus determines whether identifiers of the idle task streams on the second processing apparatus are sufficient, and if the identifiers of the idle task streams on the second processing apparatus are insufficient, the existing task stream is shared and reused, to effectively improve resource utilization.

In a possible design, the allocating, by the first processing apparatus, corresponding task streams in existing task streams on the second processing apparatus to the plurality of tasks includes:

selecting, by the first processing apparatus based on a priority of a task stream in which a first task needs to be placed, a task stream whose priority is the same as the priority of the task stream in which the first task needs to be placed from the existing task streams on the second processing apparatus, and determining the selected task stream as a task stream corresponding to the first task, where the first task is any one of the plurality of tasks.

In this embodiment of this application, when processing tasks in task streams, the second processing apparatus processes, based on priorities of the task streams and in a polling manner, tasks at the top of waiting lists of the task streams. In this way, in the foregoing implementation, priorities of task streams in which tasks need to be placed are fully considered, thereby effectively ensuring an execution sequence of tasks in different task streams.

In a possible design, the task description information further includes an identifier of an event, the event is used to indicate a dependency relationship between tasks corresponding to the event, the tasks corresponding to the event are two or more tasks that are located in different task streams and have a dependency relationship in the plurality of tasks, the two or more tasks include one dependent task and one or more depended tasks, and processing of the dependent task depends on a processing result of each depended task.

In a possible design, the method further includes:

receiving, by the first processing apparatus, a notification message sent by the second processing apparatus, where the notification message is used to indicate that the depended task or the dependent task has been processed;

updating, by the first processing apparatus, a status of the event based on the notification message; and if the first processing apparatus determines that an updated status of the event satisfies a preset condition, releasing, by the first processing apparatus, the identifier of the event for subsequent allocation.

According to a second aspect, an embodiment of this application provides a task processing method, where the method includes:

receiving, by a second processing apparatus, an instruction sent by a first processing apparatus, where the instruction includes a plurality of tasks and task description information of the plurality of tasks, the task description information of the plurality of tasks is used to indicate a dependency relationship between the plurality of tasks, and in any two tasks that have a dependency relationship, processing of one task needs to wait for a processing result of the other task; and processing, by the second processing apparatus, the plurality of tasks based on the dependency relationship between the plurality of tasks.

Because the instruction includes the plurality of tasks and the task description information of the plurality of tasks, after processing one task, the second processing apparatus may directly obtain, based on the dependency relationship between the plurality of tasks, a next task for processing. This can effectively reduce a waiting delay, fully exploit a computing capability of an acceleration chip, and improve task processing efficiency.

In a possible design, the task description information further includes an identifier of an event, the event is used to indicate a dependency relationship between tasks corresponding to the event, the tasks corresponding to the event are two or more tasks that are located in different task streams and have a dependency relationship in the plurality of tasks, the two or more tasks include one dependent task and one or more depended tasks, and processing of the dependent task depends on a processing result of each depended task.

The processing, by the second processing apparatus, the plurality of tasks based on the dependency relationship between the plurality of tasks includes:

updating, by the second processing apparatus, a status of the event to a ready state after determining that each depended task has been processed; and after the second processing apparatus determines that the dependent task is a to-be-processed task, if the second processing apparatus detects that the status of the event is the ready state, processing, by the second processing apparatus, the dependent task.

In a possible design, the method further includes:

returning, by the second processing apparatus, a notification message to the first processing apparatus after determining that the depended task or the dependent task has been processed, where the notification message is used to indicate that the depended task or the dependent task has been processed.

According to a third aspect, an embodiment of this application provides a processing apparatus. The apparatus has a function of implementing behavior of the first processing apparatus in the method example in the first aspect. The function may be implemented by using hardware, or implemented by using hardware executing corresponding software. The hardware or the software includes one or more units (or modules) corresponding to the foregoing function.

In a possible design, a structure of the apparatus includes a processing unit and a transceiver unit. The processing unit is configured to: generate a plurality of tasks, and determine task description information of the plurality of tasks, where the task description information of the plurality of tasks is used to indicate a dependency relationship between the plurality of tasks, and in any two tasks that have a dependency relationship, processing of one task needs to wait for a processing result of the other task.

The transceiver unit is configured to send an instruction to a second processing apparatus, where the instruction includes the plurality of tasks and the task description information of the plurality of tasks.

In a possible design, the task description information includes identifiers of task streams corresponding to the plurality of tasks.

The processing unit determines the task streams corresponding to the plurality of tasks in the following manner:

if the processing unit determines that a quantity of resources of idle task streams is greater than or equal to a first threshold, allocating corresponding task streams in the idle task streams to the plurality of tasks; if the processing unit determines that a quantity of resources of idle task streams is less than or equal to a second threshold, allocating corresponding task streams in existing task streams on the second processing apparatus to the plurality of tasks; or if the processing unit determines that a quantity of resources of idle task streams is greater than a second threshold and less than a first threshold, allocating corresponding task streams in the idle task streams to some of the plurality of tasks, and allocating corresponding task streams in existing task streams on the second processing apparatus to the other tasks of the plurality of tasks.

In a possible design, the processing unit is specifically configured to:

select, based on a priority of a task stream in which a first task needs to be placed, a task stream whose priority is the same as the priority of the task stream in which the first task needs to be placed from the existing task streams on the second processing apparatus, and determine the selected task stream as a task stream corresponding to the first task, where the first task is any one of the plurality of tasks.

In a possible design, the task description information further includes an identifier of an event, the event is used to indicate a dependency relationship between tasks corresponding to the event, the tasks corresponding to the event are two or more tasks that are located in different task streams and have a dependency relationship in the plurality of tasks, the two or more tasks include one dependent task and one or more depended tasks, and processing of the dependent task depends on a processing result of each depended task.

In a possible design, the transceiver unit is further configured to receive a notification message sent by the second processing apparatus, where the notification message is used to indicate that the depended task or the dependent task has been processed.

The processing unit is further configured to: update a status of the event based on the notification message; and if the processing unit determines that an updated status of the event satisfies a preset condition, release the identifier of the event.

According to a fourth aspect, an embodiment of this application provides a processing apparatus. The apparatus has a function of implementing behavior of the second processing apparatus in the method example in the second aspect. The function may be implemented by using hardware, or implemented by using hardware executing corresponding software. The hardware or the software includes one or more units (or modules) corresponding to the foregoing function.

In a possible design, a structure of the apparatus includes a processing unit and a transceiver unit. The transceiver unit is configured to receive an instruction sent by a first processing apparatus, where the instruction includes a plurality of tasks and task description information of the plurality of tasks, the task description information of the plurality of tasks is used to indicate a dependency relationship between the plurality of tasks, and in any two tasks that have a dependency relationship, processing of one task needs to wait for a processing result of the other task.

The processing unit is configured to process the plurality of tasks based on the dependency relationship between the plurality of tasks.

In a possible design, the task description information further includes an identifier of an event, the event is used to indicate a dependency relationship between tasks corresponding to the event, the tasks corresponding to the event are two or more tasks that are located in different task streams and have a dependency relationship in the plurality of tasks, the two or more tasks include one dependent task and one or more depended tasks, and processing of the dependent task depends on a processing result of each depended task.

the processing unit is specifically configured to:

update a status of the event to a ready state after determining that each depended task has been processed; and after the processing unit determines that the dependent task is a to-be-processed task, if the processing unit detects that the status of the event is the ready state, process the dependent task.

In a possible design, the transceiver unit is further configured to:

return a notification message to the first processing apparatus after it is determined that the depended task or the dependent task has been processed, where the notification message is used to indicate that the depended task or the dependent task has been processed.

According to a fifth aspect, an embodiment of this application provides a processing apparatus, where the processing apparatus includes:

a memory, configured to store a software program; and a processor, configured to: read the software program stored in the memory, and perform the method in any possible design of the first aspect or the second aspect.

An embodiment of this application further provides a computer system. The computer system includes a first processing apparatus and a second processing apparatus. The first processing apparatus has a function of implementing behavior of the first processing apparatus in the method example in the first aspect, and the second processing apparatus has a function of implementing behavior of the second processing apparatus in the method example in the second aspect. Details are not described herein again.

An embodiment of this application further provides a computer storage medium. The storage medium stores a software program. When the software program is read and executed by a first processing apparatus, the method provided in any possible design of the first aspect can be implemented.

An embodiment of this application further provides a computer storage medium. The storage medium stores a software program. When the software program is read and executed by a second processing apparatus, the method provided in any possible design of the second aspect can be implemented.

An embodiment of this application further provides a computer program product including an instruction. When the computer program product runs on a computer, the computer is enabled to perform the method provided in any possible design of the first aspect or the second aspect.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Some terms in this application are first described, to facilitate understanding of a person skilled in the art.

Computer system: is a system integrating at least two heterogeneous apparatuses. For example, the computer system may be a chip integrating at least two heterogeneous apparatuses, or a heterogeneous integration platform integrating at least two heterogeneous apparatuses.

Heterogeneous apparatuses: refer to processing apparatuses of different types. For example, processing apparatuses of different types such as a CPU, a GPU, an FPGA, and an ASIC may be mutually referred to as heterogeneous apparatuses. In another embodiment of the present invention, when processing devices of a same type have different specifications, the processing devices may also be referred to as heterogeneous apparatuses. For example, CPUs having different dominant frequencies may also be referred to as heterogeneous apparatuses.

Task: is an activity completed by software. A task may be a process or a thread. In short, a task refers to a series of operations that work together to achieve a specific purpose. The task in the embodiments of this application may include a computing task, a memory copy (memcpy) task, a virtual task, or the like. The virtual task refers to an event record (EventRecord) (for example, completion of a task) or event wait (EventWait) (for example, execution of a task can be continued only after another task is completed).

Stream: refers to a task stream that includes a plurality of tasks. The tasks in the stream need to be executed in sequence. For example, three tasks: a task 1, a task 2, and a task 3 are sequentially placed in the stream. In this case, the task 1, the task 2, and the task 3 need to be executed in sequence. In other words, the task 1 is executed first, then the task 2 is executed after the task 1 has been executed, and after the task 2 has been executed, the task 3 is executed.

"Plurality" refers to two or more than two.

To make the objectives, technical solutions, and advantages of this application clearer, the following further describes this application in detail with reference to the accompanying drawings.

Figure 1:
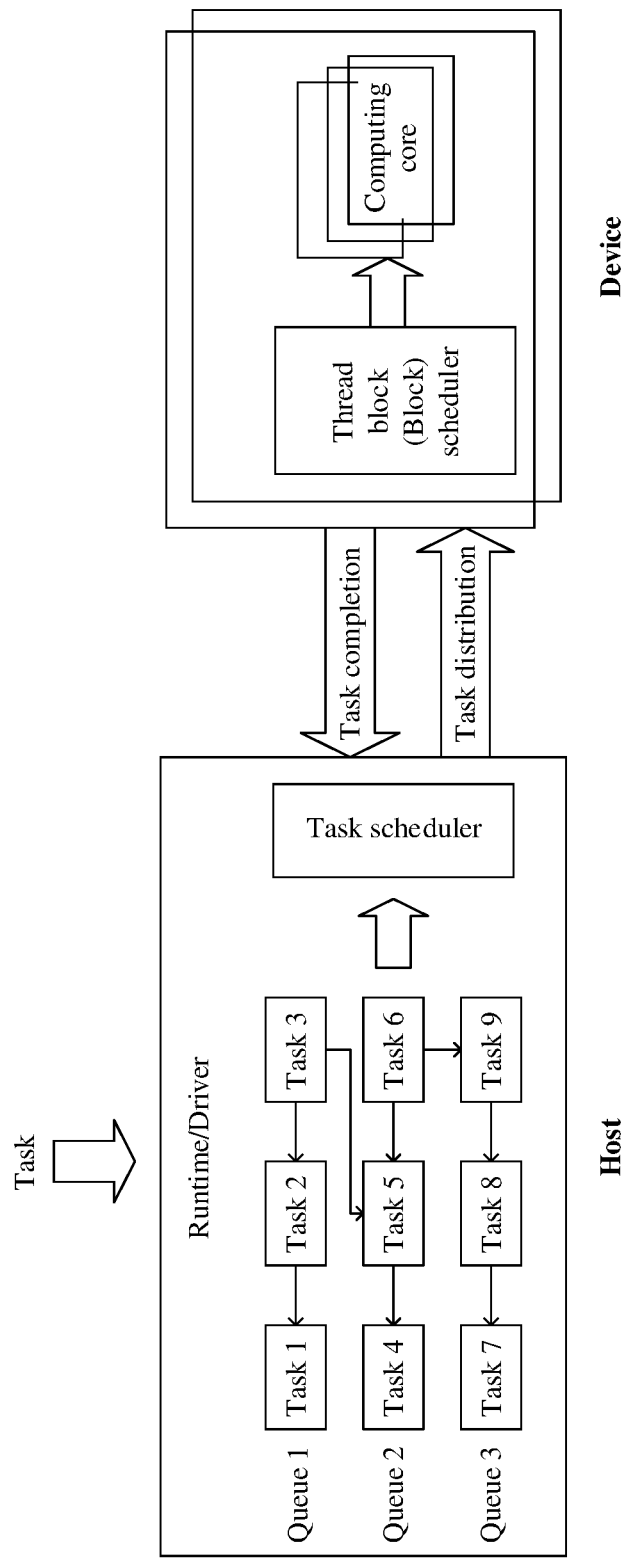
FIG. 1 is an example diagram of performing task processing by using a host-device model in the prior art.

FIG. 1 is an example diagram of performing task processing by using a host-device model in the prior art. As shown in FIG. 1, a host generates a plurality of tasks (for example, a task 1, a task 2, . . . , and a task 9 shown in FIG. 1), and places the nine tasks into corresponding queues based on a dependency relationship between the nine tasks. For example, the task 1, the task 2, and the task 3 are placed in a queue 1, the task 4, the task 5, and the task 6 are placed in a queue 2, and the task 7, the task 8, and the task 9 are placed in a queue 3. A line segment with an arrow between tasks is used to indicate a dependency relationship between the tasks, and a task to which an arrow points on the line segment depends on a task at the other end of the line segment. For example, the task 2 depends on the task 3, and the task 5 depends on the task 3. In other words, the task 3 needs to be processed before the task 2 and the task 5.

A task scheduler is deployed on the host. The task scheduler obtains a task in each queue and delivers the task to a device. For example, the task scheduler schedules the task 3 in the queue 1 and delivers the task 3 in the queue 1 to the device. After the device receives the task 3 (it is assumed that the task 3 is a computing task), a thread block scheduler may split the task 3 into a plurality of thread blocks, and distribute the plurality of thread blocks to a plurality of computing cores for parallel computing. After each computing core completes a respective computing task, the thread block scheduler sends a message to the host, to notify the host that the task 3 is completed. Then, the host can schedule a next task (the task 2) and deliver the next task to the device.

It can be learned from the foregoing process that, the host needs to send a next task only after receiving a processing result returned by the device. This causes a relatively large waiting delay of a task, and a computing capability of an acceleration chip cannot be fully exploited.

In view of this, the embodiments of this application provide a task processing method, to resolve a problem that a waiting delay of a computing task is relatively large and a computing capability of an acceleration chip cannot be fully exploited.

Figure 2:
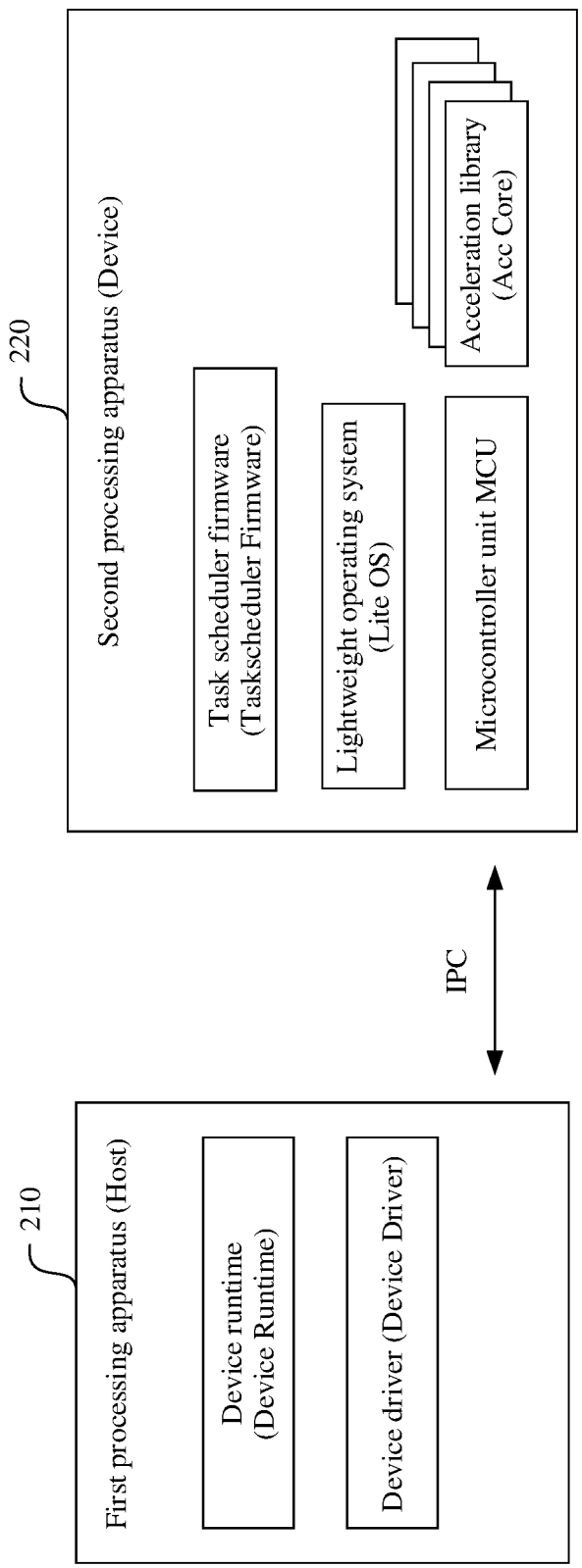
FIG. 2 is a schematic architectural diagram of a computer system according to an embodiment of this application.

The task processing method provided in the embodiments of this application is applicable to a computer system architecture shown in FIG. 2. The computer system architecture includes a first processing apparatus 210 and a second processing apparatus 220.

The first processing apparatus 210 may be a host, and a device runtime and a device driver are deployed on the first processing apparatus 210. The device during running may be configured to deliver a task to the second processing apparatus 220.

The second processing apparatus 220 may be a device. An acceleration library (Acc. Core) used for computing and a microcontroller unit (MCU), for example, an ARM core, are deployed on the second processing apparatus 220. A lightweight operating system (Lite OS) runs on the microcontroller unit. Local scheduling software, of the second processing apparatus 220, referred to as a "taskscheduler" herein, runs on the lightweight operating system. The taskscheduler is responsible for scheduling and distributing a task received from the first processing apparatus 210.

Inter-processor (core) communication (IPC) refers to a physical connection between the first processing apparatus and the second processing apparatus, and is not limited to a specific form, for example, a PCI-E.

Figure 3:
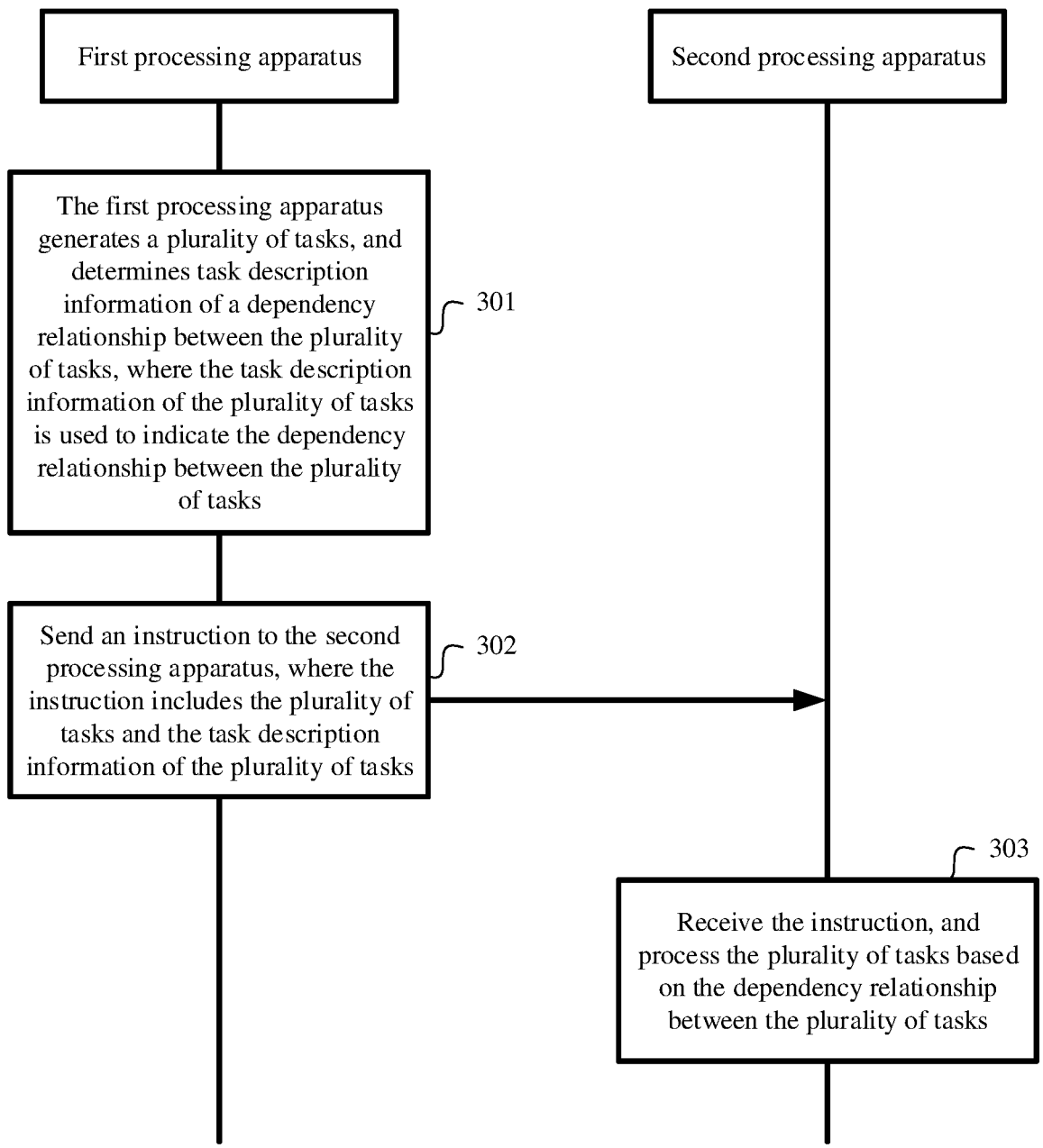
FIG. 3 is a schematic flowchart of a task processing method according to an embodiment of this application.

Based on the system architecture shown in FIG. 2, FIG. 3 is a schematic flowchart of a task processing method according to an embodiment of this application. As shown in FIG. 3, the method includes the following steps.

Step 301: A first processing apparatus generates a plurality of tasks, and determines task description information of the plurality of tasks. The task description information of the plurality of tasks is used to indicate a dependency relationship between the plurality of tasks, and in any two tasks that have a dependency relationship, execution of one task needs to wait for an execution result of the other task.

Step 302: The first processing apparatus sends an instruction to a second processing apparatus, where the instruction includes the plurality of tasks and the task description information of the plurality of tasks.

Step 303: The second processing apparatus receives the instruction, and processes the plurality of tasks based on the dependency relationship between the plurality of tasks.

It can be learned from the foregoing content that, in this embodiment of this application, the first processing apparatus sends the plurality of tasks and the task description information of the plurality of tasks to the second processing apparatus together. In this way, after processing one task, the second processing apparatus may directly obtain, based on the dependency relationship between the plurality of tasks, a next task for processing. Compared with that in the prior art in which the second processing apparatus needs to notify the first processing apparatus after processing a task, and the first processing apparatus delivers a next task, the solution in this embodiment of this application can effectively reduce a waiting delay, fully exploit a computing capability of an acceleration chip, and improve task processing efficiency. In addition, processing load of the first processing apparatus can be reduced, thereby implementing load balancing between the first processing apparatus and the second processing apparatus in a future scenario in which a computing capability of the second processing apparatus is expanded, better balancing a computing capability and a data moving capacity, and improving overall performance in an AI scenario with an increased computing capability of a chip, a high data throughput, and a multi-layer data dependency feature.

Specifically, the first processing apparatus may be a CPU, and from a bottom layer to an upper layer, a software stack of the CPU includes an operating system, a driver or a runtime, a program framework, and service code. Generally, the service code is an application program, for example, a voice recognition program or an image processing program. The application program enables, by invoking an application programming interface (application programming interface, API) of the operating system, the operating system to execute a command (action) of the application program. In step 301 in this embodiment of this application, that the first processing apparatus generates the plurality of tasks may be specifically that the application program on the first processing apparatus enables, by invoking the API of the operating system, the operating system to generate the plurality of tasks. It should be noted that, the application program on the first processing apparatus may enable, by invoking one API of the operating system, the operating system to generate the plurality of tasks, or may enable, by invoking a plurality of APIs of the operating system, the operating system to generate the plurality of tasks. Further, the first processing apparatus may further determine the dependency relationship between the plurality of tasks based on a description of a developer.

For example, the plurality of tasks generated by the first processing apparatus are a task 1, a task 2, and a task 3. The task 1 is generated by the application program on the first processing apparatus by invoking a first API of the operating system, and the task 2 and the task 3 are generated by the application program on the first processing apparatus by invoking a second API of the operating system. The dependency relationship between the plurality of tasks is that the task 3 depends on the task 1 and the task 2. In other words, the task 1 and the task 2 need to be processed before the task 3. Because the task 1 and the task 2 are generated by invoking different APIs, the task 1 and the task 2 can be processed concurrently (assuming that there are no other constraints).

The second processing apparatus may be a GPU. In step 302, the task description information sent by the first processing apparatus to the second processing apparatus may include identifiers of task streams corresponding to the plurality of tasks.

Specifically, the task streams corresponding to the plurality of tasks may be determined in the following manner: if the first processing apparatus determines that a quantity of resources of idle task streams is greater than or equal to a first threshold, allocating corresponding task streams in the idle task streams to the plurality of tasks; if the first processing apparatus determines that a quantity of resources of idle task streams is less than or equal to a second threshold, allocating corresponding task streams in existing task streams on the second processing apparatus to the plurality of tasks; or if the first processing apparatus determines that a quantity of resources of idle task streams is greater than a second threshold and less than a first threshold, allocating corresponding task streams in the idle task streams to some of the plurality of tasks, and allocating corresponding task streams in existing task streams on the second processing apparatus to the other tasks of the plurality of tasks.

In other words, When determining the identifiers of the task streams corresponding to the plurality of tasks, the first processing apparatus needs to determine whether the quantity of resources of the idle task streams is sufficient. In a possible implementation, a task stream list may be maintained on the first processing apparatus, as shown in Table 1.

TABLE 1

Example of a task stream list

| Identifier of a task stream | Status of the task stream (streamstate) |
|---|---|
| stream 1 | . . . |
| stream 2 | . . . |
| . . . | . . . |
| stream m | . . . |

Specifically, the first processing apparatus may update a status (streamstate) of each task stream on the second processing apparatus based on an accommodating status corresponding to each task stream. The status of the task stream may be specifically a quantity of resident tasks in the task stream.

In this embodiment of this application, a quantity of task streams may be preset, and the first processing apparatus may determine, based on a quantity of task streams in Table 1 and a preset quantity of task streams, whether the quantity of resources of the idle task streams is sufficient. The quantity of resources of the idle task streams may be specifically a quantity of identifiers of the idle task streams. The identifier of the task stream may be information used to uniquely identify the task stream, for example, the identifier of the task stream may be a serial number of the task stream. In an example, it is assumed that the preset quantity of task streams is 100. If the quantity of task streams in Table 1 is 100, it indicates that there is no identifier of an idle task stream at this time. If the quantity of task streams in Table 1 is 99, it indicates that there is an identifier of one idle task stream at this time.

For example, because the task 1, the task 2, and the task 3 in the foregoing example are generated by invoking different APIs, the task 1, the task 2, and the task 3 need to be placed in two task streams (the task 1 is placed in one task stream, and the task 2 and the task 3 are placed in the other task stream).

If the first processing apparatus determines that the quantity of the identifiers of the idle task streams is greater than or equal to the first threshold (the first threshold may be set based on an actual requirement, and in this example, the first threshold may be a value greater than or equal to 2, for example, 2), it indicates that identifiers of idle task streams on the second processing apparatus are completely sufficient. In this case, the first processing apparatus may allocate identifiers of any two idle task streams to the task 1, the task 2, and the task 3, for example, allocate an identifier (stream 1) of an idle task stream to the task 1, and allocate an identifier (stream 2) of an idle task stream to the task 2 and the task 3. In this way, after receiving the instruction sent by the first processing apparatus, the second processing apparatus may place, based on the identifier (stream 1) that is of the task stream corresponding to the task 1 and that is included in the instruction, the task 1 in the task stream whose identifier is the stream 1; and the second processing apparatus places, based on the identifier (stream 2) that is of the task stream corresponding to the task 2 and the task 3 and that is included in the instruction, the task 2 and the task 3 in the task stream whose identifier is the stream 2.

If the first processing apparatus determines that the quantity of the identifiers of the idle task streams is less than or equal to the second threshold (the second threshold may be set based on an actual requirement, and in this example, the second threshold may be 0), it indicates that there is no identifier of an idle task stream at this time. In this case, the first processing apparatus may allocate corresponding identifiers of task streams in identifiers of the existing task streams on the second processing apparatus to the plurality of tasks. In other words, an existing task stream s shared and reused. For example, an existing task stream 1 on the second processing apparatus is determined as the task stream corresponding to the task 1, and an existing task stream 2 is determined as the task stream corresponding to the task 2 and the task 3. In this way, after receiving the instruction sent by the first processing apparatus, the second processing apparatus may place the task 1 in the existing task stream 1 based on the identifier (stream 1) that is of the task stream corresponding to the task 1 and that is included in the instruction, and place the task 2 and the task 3 in the existing task stream 2.

In this embodiment of this application, the first processing apparatus may determine, based on priorities of the existing task streams on the second processing apparatus, task streams corresponding to the plurality of tasks.

For example, for the task 1, the first processing apparatus may select a task stream (for example, a task stream 1) whose priority is 1 from the existing task streams based on a priority (for example, the priority is 1) of a task stream in which the task 1 needs to be placed. In this case, if the task stream 1 can continue to accommodate a task, the task stream 1 may be determined as a task stream corresponding to the task 1. Correspondingly, after receiving the instruction, the second processing apparatus may place the task 1 in the existing task stream 1. In this case, if the task stream 1 cannot continue to accommodate a task, the task stream 1 cannot be shared and reused, and the task 1 may be blocked until there is an identifier of an idle task stream or the task stream 1 can continue to accommodate a task.

For the task 2 and the task 3, the first processing apparatus may select a task stream (for example, a task stream 2) whose priority is 2 from the existing task streams based on a priority (for example, the priority is 2) of a task stream in which the task 2 and the task 3 need to be placed. In this case, if the task stream 2 may continue to accommodate two tasks, the task stream 2 may be determined as a task stream corresponding to the task 2 and the task 3. Correspondingly, after receiving the instruction, the second processing apparatus may place the task 2 and the task 3 in the existing task stream 2. In this case, if the task stream 2 can continue to accommodate only one task, the task stream 2 is determined as a task stream corresponding to the task 2, and the task 3 is blocked until the task stream 2 can continue to accommodate a task. Correspondingly, after receiving the instruction, the second processing apparatus may place the task 2 in the existing task stream 2. In this case, if the task stream 2 cannot continue to accommodate a task, the task 2 and the task 3 may be blocked until there is an identifier of an idle task stream or the task stream 2 can continue to accommodate a task.

In this embodiment of this application, when processing tasks in task streams, the second processing apparatus processes, based on priorities of the task streams and in a polling manner, tasks at the top of waiting lists of the task streams. In this way, in the foregoing implementation, priorities of task streams in which tasks need to be placed are fully considered, thereby effectively ensuring an execution sequence of tasks in different task streams. In addition, the first processing apparatus generates the task 1, the task 2, and the task 3 (the priority of the task stream in which the task 1 needs to be placed is 1, and the priority of the task stream in which the task 2 and the task 3 need to be placed is 2). It is assumed that the first processing apparatus determines that a quantity of the identifiers of the task streams on the second processing apparatus is less than or equal to the second threshold, a task stream whose priority is 1 in the existing task streams on the second processing apparatus cannot continue to accommodate a task (that is, the task 1 cannot share and reuse the existing task stream), and a task stream whose priority is 2 cannot continue to accommodate a task (that is, the task 2 and the task 3 cannot share and reuse the existing task stream). In this case, the plurality of tasks (the task 1, the task 2, and the task 3) may not be distributed, that is, the plurality of tasks are retained on the first processing apparatus for processing. In this way, less memory resources of the second processing apparatus are occupied, thereby better adapting to a scenario in which memory resources of the second processing apparatus are limited. Further, it is convenient for the first processing apparatus to perform global heterogeneous resource balanced scheduling.

If the first processing apparatus determines that a quantity of the identifiers of the task streams on the second processing apparatus is greater than the second threshold and less than the first threshold, it indicates that the identifiers of the idle task streams on the second processing apparatus are insufficient (it is assumed that there is only one identifier of the idle task stream). In this case, the first processing apparatus may allocate the identifier (stream 1) of the idle task stream to the task 1, and determine an existing task stream (for example, a task stream 2 whose identifier is stream 2) on the second processing apparatus as a task stream corresponding to the task 2 and the task 3. In this way, after receiving the instruction sent by the first processing apparatus, the second processing apparatus may place, based on the identifier (stream 1) that is of the task stream corresponding to the task 1 and that is included in the instruction, the task 1 in the task stream 1; and the second processing apparatus places, based on the identifier (stream 2) that is of the task stream corresponding to the task 2 and the task 3 and that is included in the instruction, the task 2 and the task 3 in the existing task stream 2.

Herein, it should be noted that a plurality of existing task streams may exist on the second processing apparatus. The first processing apparatus may select, from the plurality of existing task streams and based on priorities of task streams in which the task 2 and the task 3 need to be placed, a task stream that is to be shared and reused by the task 2 and the task 3. For details, reference may be made to the foregoing descriptions.

In this embodiment of this application, the first processing apparatus may alternatively allocate identifiers of the idle task streams to the task 2 and the task 3, and select a task stream corresponding to the task 1 from the existing task streams. In specific implementation, proper and flexible adjustment may be performed based on an actual situation, and this is not specifically limited.

It can be learned from the foregoing content that, when determining the identifiers of the task streams corresponding to the plurality of tasks, the first processing apparatus determines whether identifiers of the idle task streams on the second processing apparatus are sufficient, and if the identifiers of the idle task streams on the second processing apparatus are insufficient, the existing task stream is shared and reused, to effectively improve resource utilization.

In another possible implementation, if the first processing apparatus determines that the identifiers of the idle task streams on the second processing apparatus are insufficient, sharing and reusing may not be performed, and the first processing apparatus may directly block a task until there is an identifier of an idle task stream. Alternatively, the first processing apparatus may directly return an error. This is not specifically limited.

Further, it can be learned from the dependency relationship between the task 1, the task 2, and the task 3 in the foregoing example that, the task 3 depends on the task 2, and also depends on the task 1. Because the task 2 and the task 3 are located in a same task stream, the task 2 and the task 3 may be placed in the task stream in sequence, so that it can be ensured that the task 2 is processed before the task 3. For the task 1 and the task 3 that are located in different task streams, the dependency relationship may be indicated by using an event in this embodiment of this application. The following describes a specific implementation process.

The developer may create an event based on a dependency relationship between generated tasks. In specific implementation, the developer writes service code, so that the application program on the first processing apparatus invokes the API of the operating system to generate the event. The event is used to indicate a dependency relationship between tasks corresponding to the event, the tasks corresponding to the event are two or more tasks that are located in different task streams and have a dependency relationship in the plurality of tasks, the two or more tasks include one dependent task and one or more depended tasks, and processing of the dependent task depends on a processing result of each depended task. For example, in the foregoing example, the developer may create an event based on the dependency relationship between the task 1 and the task 3. In this case, tasks corresponding to the event are the task 1 and the task 3, the task 3 is a dependent task, and the task 1 is a depended task.

In this embodiment of this application, one event list may be synchronously maintained on the first processing apparatus and the second processing apparatus. Table 2 shows an example of the event list.

TABLE 2

Example of an event list

| Identifier of an event | Status of the event (eventstate) |
|---|---|
| event 1 | . . . |
| event 2 | . . . |
| . . . | . . . |
| event n | . . . |

In this embodiment of this application, the identifier of the event may be information that can uniquely identify the event, for example, a serial number of the event. This is not specifically limited.

Based on the foregoing example, after generating the task 1, the task 2, and the task 3, if the first processing apparatus determines that there is an identifier of an idle event, the first processing apparatus may generate an identifier (for example, event n+1) of an event corresponding to the task 1 and the task 3, add the identifier of the event to the event list maintained on the first processing apparatus, and send the identifier of the event to the second processing apparatus by using an instruction.

Correspondingly, after receiving the instruction, the second processing apparatus may add the identifier (event n+1) that is of the event and that is included in the instruction to the event list maintained on the second processing apparatus. In this case, a status corresponding to the event may be a default state. This is not specifically limited. Further, after determining that the depended task (the task 1) in the tasks corresponding to the event has been processed, the second processing apparatus updates the status corresponding to the event to a ready state. Subsequently, after the second processing apparatus determines that the dependent task (the task 3) in the tasks corresponding to the event is a to-be-processed task, if the second processing apparatus detects that the status of the event is the ready state, the second processing apparatus processes the dependent task. If the status of the event is not the ready state, the second processing apparatus waits until the second processing apparatus detects that the status of the event is the ready state.

In this embodiment of this application, after determining that the task has been processed, the second processing apparatus may further return a notification message to the first processing apparatus, where the notification message is used to indicate that the task has been processed. The first processing apparatus updates the status of the event based on the notification message returned by the second processing apparatus, to manage the identifier of the event. For example, the second processing apparatus returns a notification message to the first processing apparatus, where the notification message is used to indicate that the depended task has been processed. Then, the first processing apparatus may update the status of the event based on the notification message. For another example, the second processing apparatus returns a notification message to the first processing apparatus, where the notification message is used to indicate that the dependent task has been processed. Then, the first processing apparatus may re-update the status of the event based on the notification message. Further, after the first processing apparatus updates the status of the event, if the first processing apparatus determines that an updated status of the event satisfies a preset condition, the first processing apparatus releases the identifier of the event for subsequent allocation. The preset condition may be set based on an actual requirement.

Further, after determining to release the identifier of the event, the first processing apparatus may further send a synchronization message to the second processing apparatus, where the synchronization message is used to indicate the second processing apparatus to release the identifier of the event. This ensures consistency between the event list maintained on the first processing apparatus and the event list maintained on the second processing apparatus.

In a possible implementation, the first processing apparatus may manage the identifier of the event in a lazy allocation manner, to improve turnover of the identifier of the event. In this embodiment of this application, an event record (EventRecord) and event wait (EventWait) may be abstracted as virtual tasks, which are similar to a computing task and a memory copy task. A unique task identifier in a process is allocated to each virtual task, so that a delivered task corresponds to a reported task. Specifically, the first processing apparatus may manage the identifier of the event by using a counter, and release the identifier of the event when the counter is 0. A possible counting manner is as follows:

(1) Event wait: After the first processing apparatus sends an instruction, the counter is increased by 1. After executing the event wait, the second processing apparatus returns an execution result to the first processing apparatus. In this case, the counter is decreased by 1 after the first processing apparatus receives the execution result.

(2) Event record: After the first processing apparatus sends an instruction, the counter is increased by 1. After executing the event record, the second processing apparatus returns an execution result to the first processing apparatus. In this case, the counter is decreased by 1 after the first processing apparatus receives the execution result.

In the foregoing example, the instruction sent by the first processing apparatus to the second processing apparatus may further include a virtual task (event record, that is, the task 1 is completed; and event wait, that is, the task 3 needs to wait for processing). Because the instruction includes the event record and the event wait, after the first processing apparatus sends the instruction, the counter of the event changes to 2 (the counter is increased by 1 for the event wait, and the counter is increased by 1 for the event record). Subsequently, after the execution result of the event record is received, the counter is decreased by 1. After the execution result of the event wait is received, the counter is decreased by 1 again, and changes to 0. In this case, it may be considered that the status of the event satisfies the preset condition, and the first processing apparatus can release the identifier of the event.

It should be noted that, if the first processing apparatus determines that there is no identifier of an idle event, the first processing apparatus may block a to-be-processed task and wait until there is an identifier of an idle event. Alternatively, the first processing apparatus may return an error. In this embodiment of this application, the first processing apparatus may determine, in a plurality of manners, whether there is an identifier of an idle event. For example, the first processing apparatus may perform determining based on a preset quantity of events and a quantity of events included in the event list. If the preset quantity of events is 1024, and the quantity of events in the event list is also 1024, it indicates that there is no identifier of an idle event. If the preset quantity of events is 1024, and the quantity of events in the event list is moo, it indicates that there is an identifier of an idle event.

In this embodiment of this application, if a process on the first processing apparatus exits abnormally, a host operating system or a kernel-mode driver may clear a task stream and an event resource.

Figure 4A:
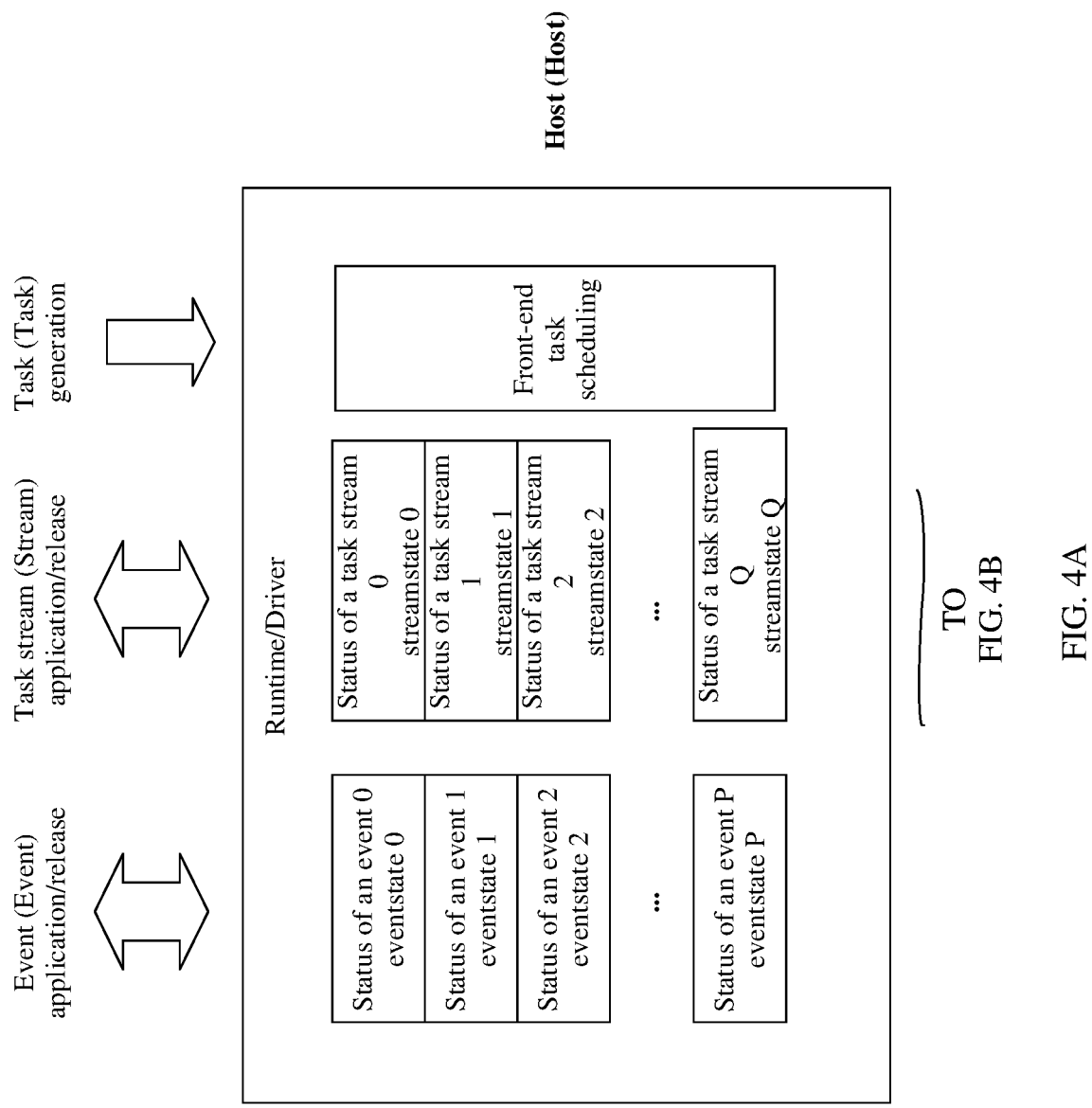
FIG. 4A and FIG. 4B are a schematic diagram of scheduling cooperation between a host and a device according to an embodiment of this application.
Figure 4B:
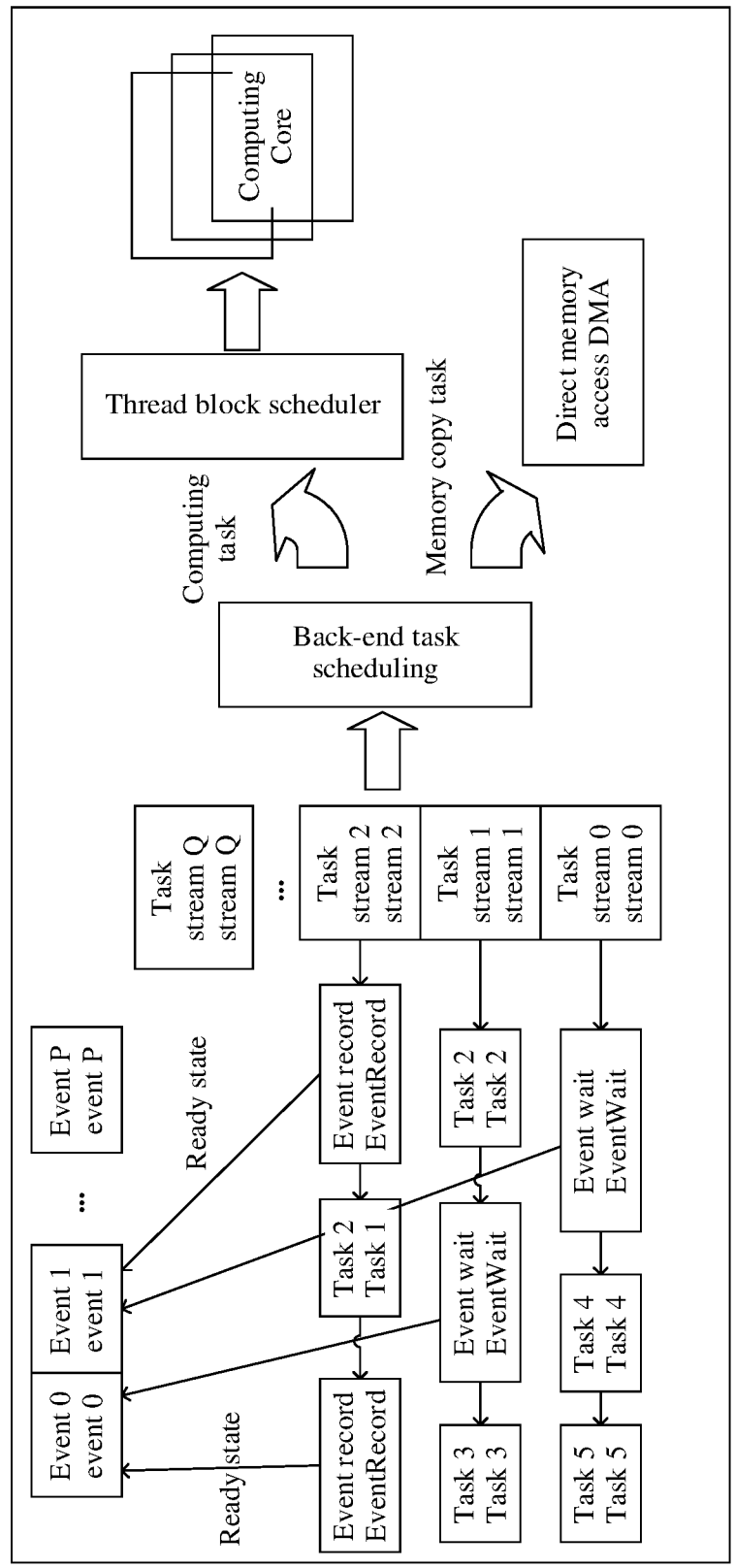

Based on the foregoing description, FIG. 4A and FIG. 4B are a schematic diagram of scheduling cooperation between a host and a device according to an embodiment of this application. The following describes an overall implementation process of this embodiment of this application with reference to FIG. 4A and FIG. 4B.

On the host, a runtime provides an API for a developer to describe concurrent tasks. A stream or an event is a context environment in which a task runs. The runtime stores statuses of each created stream and event. When receiving API invocation for computing tasks, the runtime immediately sends the tasks to the device, and attaches a dependency relationship between the tasks (or attach execution conditions, for example, event records, of the tasks). Although the host sends the tasks to the device, it does not mean that the tasks can be executed immediately. Processing on the host may be understood as orchestration of tasks in a plurality of concurrent task streams, namely, front-end scheduling on the tasks.

On the device, a plurality of task streams are maintained. A taskscheduler checks a queue header of each task stream to obtain to-be-processed tasks, that is, performs back-end scheduling on the tasks. Specifically, the taskscheduler may process, based on priorities (the priorities may be preset, and are not specifically limited herein) of the task streams and in a polling manner, tasks at the top of waiting lists of the task streams. If the task is a computing task, and a scheduling slot of a kernel is idle, a thread block scheduler sends the task to a computing core for scheduling and execution. For a specific execution manner, refer to the foregoing description in FIG. 1. Details are not described herein again. If the task is a memory copy task and there is an idle direct memory access (DMA) channel, the task is sent to the DMA for execution. If the task is an event wait task, whether a status of a corresponding event is a ready state is checked. If the task is an event record task, a status of a corresponding event is set to a ready state. Further, to maintain an event resource, an event destroy (EventDestroy) task (corresponding to an event creation task) may be further added in this embodiment of this application. If the task is an event destroy task, a status of a corresponding event is set to a non-ready state. In addition, the taskscheduler records a status for an event record. In this way, when a prerequisite is satisfied (for example, a task is completed), the taskscheduler can quickly schedule a next task locally without notifying the host over IPC.

In a possible example, a function performed by the taskscheduler may be implemented by using software, and a function performed by the thread block scheduler may be implemented by using an application-specific integrated circuit (ASIC).

It can be learned from the foregoing content that, in this embodiment of this application, task scheduling is divided into two parts: front-end scheduling on the host and back-end scheduling on the device. The front-end scheduling is responsible for description and delivery of a dependency relationship between tasks, and the back-end scheduling is responsible for scheduling and execution of the tasks. This can reduce processing load of the host, and implement load balancing between the host and the device in a future scenario in which a computing capability of the device is expanded. Further, a CPU processing core and DMA hardware are disposed on the device. The CPU processing core performs a back-end scheduling function, and the DMA hardware performs a data moving task. This improves task processing efficiency.

For the foregoing method procedure, an embodiment of this application further provides a computer system. The computer system includes a first processing apparatus and a second processing apparatus. The first processing apparatus and the second processing apparatus may implement corresponding functions in the method procedure shown in FIG. 3. For details, refer to detailed descriptions in the method example. Details are not described herein again.

It should be noted that the first processing apparatus and the second processing apparatus in this application may be two independent chips. For example, the first processing apparatus is a CPU, and the second processing apparatus is a GPU. Alternatively, the first processing apparatus and the second processing apparatus may be two different circuit modules, and are integrated together to form a chip. For example, the second processing apparatus that is an NPU and the first processor that is a CPU are integrated together to form a chip.

Figure 5:
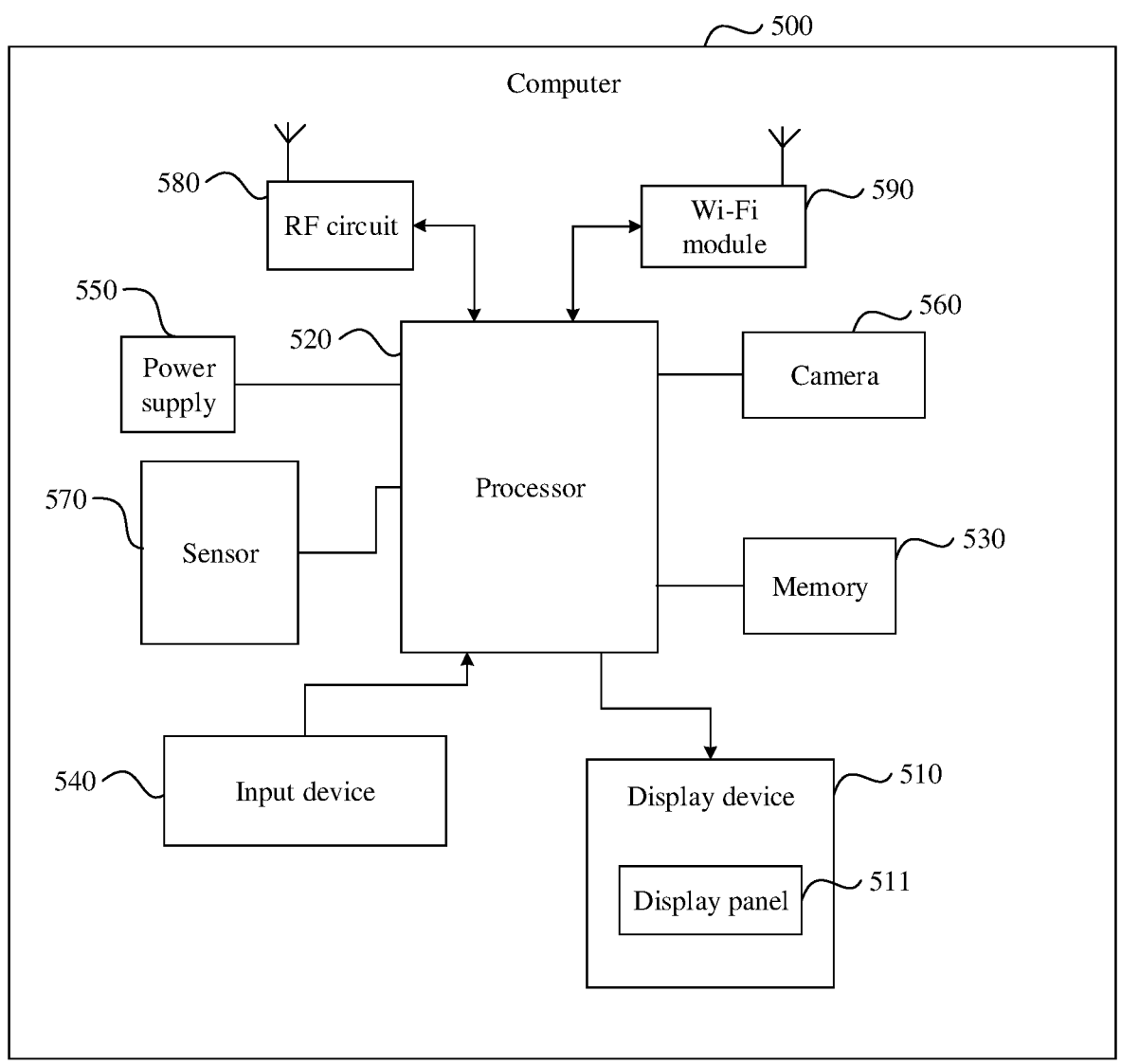
FIG. 5 is a schematic diagram of a hardware structure of a computer to which an embodiment of this application is applied.

FIG. 5 is a schematic diagram of a hardware structure of a computer to which an embodiment of this application is applied. As shown in FIG. 5, a computer 500 includes a display device 510, a processor 520, and a memory 530.

The memory 530 may be configured to store a software program and data. The processor 520 executes various functional applications of the computer 500 and processes data by running the software program and the data that are stored in the memory 530. The memory 530 may mainly include a program storage area and a data storage area. The program storage area may store information about an operating system, an application program required by at least one function (such as a value calculation function), and the like. The data storage area may store data (such as audio data and image data) created based on use of the computer 500, and the like. In addition, the memory 530 may include a high-speed random access memory, or may include a nonvolatile memory, for example, at least one magnetic disk storage device, a flash memory device, or another volatile solid-state storage device. The processor 520 is a control center of the computer 500, and is connected to all parts of the entire computer by using various interfaces and cables. The processor 520 executes various functions of the computer 500 and processes data by running or executing a software program and/or data that are/is stored in the memory 530, to perform overall monitoring on the computer. The processor 520 may include one or more general-purpose processors, and may further include one or more GPUs, configured to perform a related operation, to implement the technical solutions provided in the embodiments of this application.

The computer 500 further includes a camera 560 for shooting an image or recording a video. The camera 560 may be an ordinary camera, or may be a focusing camera.

The computer 500 may further include an input device 540, configured to: receive input number information, character information, or a contact touch operation/non-contact gesture, and generate signal input that is related to user settings and function control of the computer 500, and the like.

The display device 510 includes a display panel 511, configured to display information input by a user or information provided for a user, various menu interfaces of the computer 500, and the like. Optionally, the display panel 511 may be in a form of a liquid crystal display (LCD), an organic light-emitting diode (OLED), or the like.

In addition, the computer 500 may further include a power supply 550, configured to supply power to other modules. The computer 500 may further include one or more sensors 570, for example, an image sensor, an infrared sensor, and a laser sensor. The computer 500 may further include a radio frequency (RF) circuit 580, configured to perform network communication with a wireless network device. The computer 500 may further include a Wi-Fi module 590, configured to perform Wi-Fi communication with another device to obtain an image, data, or the like transmitted by the another device.

Figure 6:
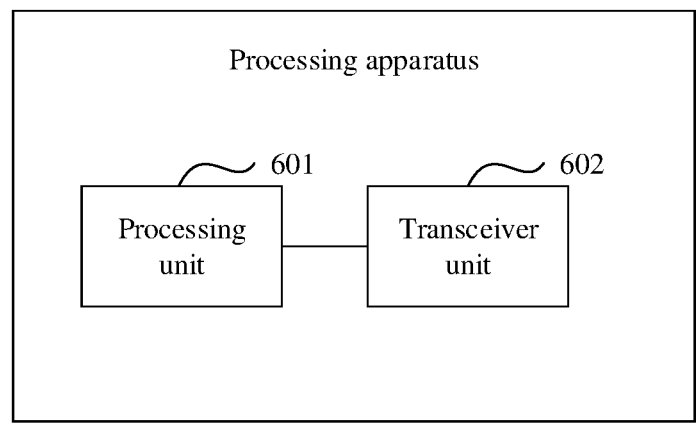
FIG. 6 is a schematic structural diagram of a processing apparatus according to an embodiment of this application.

FIG. 6 is a schematic structural diagram of a processing apparatus according to an embodiment of this application. The apparatus has a function of implementing behavior of the first processing apparatus in the method procedure shown in FIG. 3. The processing apparatus 600 includes a processing unit 601 and a transceiver unit 602. The processing unit 601 is configured to: generate a plurality of tasks, and determine task description information of the plurality of tasks, where the task description information of the plurality of tasks is used to indicate a dependency relationship between the plurality of tasks, and in any two tasks that have a dependency relationship, processing of one task needs to wait for a processing result of the other task.

The transceiver unit 602 is configured to send an instruction to a second processing apparatus, where the instruction includes the plurality of tasks and the task description information of the plurality of tasks.

In a possible design, the task description information includes identifiers of task streams corresponding to the plurality of tasks.

The processing unit 601 determines the task streams corresponding to the plurality of tasks in the following manner:

if the processing unit 601 determines that a quantity of resources of idle task streams is greater than or equal to a first threshold, allocating corresponding task streams in the idle task streams to the plurality of tasks;

if the processing unit 601 determines that a quantity of resources of idle task streams is less than or equal to a second threshold, allocating corresponding task streams in existing task streams on the second processing apparatus to the plurality of tasks; or if the processing unit 601 determines that a quantity of resources of idle task streams is greater than a second threshold and less than a first threshold, allocating corresponding task streams in the idle task streams to some of the plurality of tasks, and allocating corresponding task streams in existing task streams on the second processing apparatus to the other tasks of the plurality of tasks.

In a possible design, the processing unit 601 is specifically configured to:

select, based on a priority of a task stream in which a first task needs to be placed, a task stream whose priority is the same as the priority of the task stream in which the first task needs to be placed from the existing task streams on the second processing apparatus, and determine the selected task stream as a task stream corresponding to the first task, where the first task is any one of the plurality of tasks.

In a possible design, the task description information further includes an identifier of an event, the event is used to indicate a dependency relationship between tasks corresponding to the event, the tasks corresponding to the event are two or more tasks that are located in different task streams and have a dependency relationship in the plurality of tasks, the two or more tasks include one dependent task and one or more depended tasks, and processing of the dependent task depends on a processing result of each depended task.

In a possible design, the transceiver unit 602 is further configured to receive a notification message sent by the second processing apparatus, where the notification message is used to indicate that the depended task or the dependent task has been processed.

The processing unit 601 is further configured to: update a status of the event based on the notification message; and if the processing unit determines that an updated status of the event satisfies a preset condition, release the identifier of the event.

Figure 7:
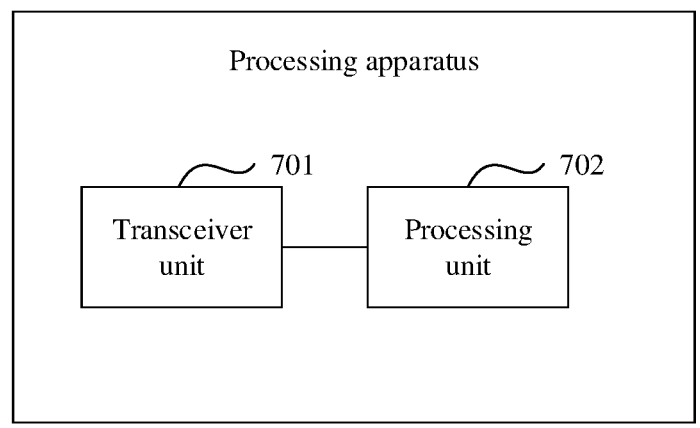
FIG. 7 is a schematic structural diagram of another processing apparatus according to an embodiment of this application.

FIG. 7 is a schematic structural diagram of another processing apparatus according to an embodiment of this application. The apparatus has a function of implementing behavior of the second processing apparatus in the method procedure shown in FIG. 3. The processing apparatus 700 includes a transceiver unit 701 and a processing unit 702. The transceiver unit 701 is configured to receive an instruction sent by a first processing apparatus, where the instruction includes a plurality of tasks and task description information of the plurality of tasks, the task description information of the plurality of tasks is used to indicate a dependency relationship between the plurality of tasks, and in any two tasks that have a dependency relationship, processing of one task needs to wait for a processing result of the other task.

The processing unit 702 is configured to process the plurality of tasks based on the dependency relationship between the plurality of tasks.

In a possible design, the task description information further includes an identifier of an event, the event is used to indicate a dependency relationship between tasks corresponding to the event, the tasks corresponding to the event are two or more tasks that are located in different task streams and have a dependency relationship in the plurality of tasks, the two or more tasks include one dependent task and one or more depended tasks, and processing of the dependent task depends on a processing result of each depended task.

The processing unit 702 is specifically configured to:

update a status of the event to a ready state after determining that each depended task has been processed; and after the processing unit 702 determines that the dependent task is a to-be-processed task, if the processing unit 702 detects that the status of the event is the ready state, process the dependent task.

In a possible design, the transceiver module 701 is further configured to:

return a notification message to the first processing apparatus after it is determined that the depended task or the dependent task has been processed, where the notification message is used to indicate that the depended task or the dependent task has been processed.

It should be noted that, in this embodiment of this application, unit division is an example, and is merely a logical function division. In actual implementation, another division manner may be used. Functional units in the embodiments of this application may be integrated into one processing unit, or each of the units may exist alone physically, or two or more units are integrated into one unit. The integrated unit may be implemented in a form of hardware, or may be implemented in a form of a software functional unit.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of the present invention are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

This application is described with reference to the flowcharts and/or block diagrams of the method, the apparatus (device), and the computer program product according to the embodiments of this application. It should be understood that computer program instructions may be used to implement each procedure and/or each block in the flowcharts and/or the block diagrams and a combination of a procedure and/or a block in the flowcharts and/or the block diagrams. These computer program instructions may be provided for a general-purpose computer, a special-purpose computer, an embedded processor, or a processor of any other programmable data processing device to generate a machine, so that the instructions executed by a computer or a processor of any other programmable data processing device generate an apparatus for implementing a specific function in one or more procedures in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more procedures in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more procedures in the flowcharts and/or in one or more blocks in the block diagrams.

Although this application is described with reference to specific features and the embodiments thereof, certainly, various modifications and combinations may be made to them without departing from the spirit and scope of this application. Correspondingly, the specification and accompanying drawings are merely example description of this application defined by the accompanying claims, and is considered as any of or all modifications, variations, combinations or equivalents that cover the scope of this application. Certainly, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A task processing method, comprising:
generating, by a first processing apparatus, a plurality of tasks;
determining task description information of the plurality of tasks, wherein the task description information of the plurality of tasks indicates a dependency relationship between the plurality of tasks, and that when any two tasks of the plurality of tasks have the dependency relationship, processing of one task needs to wait for a processing result of the other task;
sending, by the first processing apparatus, an instruction to a second processing apparatus, wherein the instruction comprises the plurality of tasks and the task description information of the plurality of tasks, and wherein the second processing apparatus is configured to execute the plurality of tasks based at least in part on the dependency relationship; and
returning, by the second processing apparatus, a notification message to the first processing apparatus after determining that a depended task of the plurality of tasks or a dependent task of the plurality of tasks has been processed, wherein the notification message indicates that the depended task or the dependent task has been processed.

2. The method according to claim 1, wherein the task description information comprises identifiers of task streams corresponding to the plurality of tasks, and a first threshold is greater than a second threshold; and, to determine the task streams corresponding to the plurality of tasks, the method further comprises:
when a quantity of resources of idle task streams is greater than or equal to the first threshold, allocating corresponding task streams in the idle task streams to the plurality of tasks;
when the quantity of resources of idle task streams is less than or equal to the second threshold, allocating, by the first processing apparatus, corresponding task streams in existing task streams on the second processing apparatus to the plurality of tasks; or
when the quantity of resources of idle task streams is greater than the second threshold and less than the first threshold, allocating the corresponding task streams in the idle task streams to a first portion of the plurality of tasks, and allocating the corresponding task streams in the existing task streams on the second processing apparatus to a second portion of the plurality of tasks.

3. The method according to claim 2, wherein allocating, by the first processing apparatus, the corresponding task streams in the existing task streams on the second processing apparatus to the plurality of tasks comprises:
selecting, by the first processing apparatus and based on a required task stream priority for a first task, a task stream whose priority is the same as the required task stream priority from the existing task streams on the second processing apparatus; and
determining the selected task stream as corresponding to the first task, wherein the first task is any one of the plurality of tasks.

4. The method according to claim 1, further comprising:
receiving, by the second processing apparatus, the instruction sent by the first processing apparatus; and
processing, by the second processing apparatus, the plurality of tasks based on the dependency relationship between the plurality of tasks.

5. The method according to claim 4, wherein the task description information comprises an identifier of an event, the event indicates a second dependency relationship between tasks corresponding to the event, the tasks corresponding to the event are two or more tasks that are located in different task streams and have the dependency relationship in the plurality of tasks, the two or more tasks comprise the dependent task and the depended task, and processing of the dependent task depends on a processing result of the depended task.

6. The method according to claim 5, wherein processing, by the second processing apparatus, the plurality of tasks based on the dependency relationship between the plurality of tasks comprises:
updating, by the second processing apparatus, a status of the event to a ready state after determining that the depended task has been processed; and
after the second processing apparatus determines that the dependent task is a to-be-processed task, and in response to the second processing apparatus detecting that the status of the event is the ready state, processing, by the second processing apparatus, the dependent task.

7. The method according to claim 1, further comprising:
receiving, by the first processing apparatus, the notification message sent by the second processing apparatus;
updating, by the first processing apparatus, a status of an event based on the notification message; and
in response to the first processing apparatus determining that an updated status of the event satisfies a preset condition, releasing, by the first processing apparatus, an identifier of the event.

8. A processing apparatus, wherein the processing apparatus comprises:
a memory storage comprising instructions; and
one or more processors in communication with the memory storage, wherein the one or more processors execute the instructions to:
generate a plurality of tasks;
determine task description information of the plurality of tasks, wherein the task description information of the plurality of tasks indicates a dependency relationship between the plurality of tasks, and that when any two tasks of the plurality of tasks have the dependency relationship, processing of one task needs to wait for a processing result of the other task;
send an instruction to a second processing apparatus, wherein the instruction comprises the plurality of tasks and the task description information of the plurality of tasks, and wherein the second processing apparatus is configured to execute the plurality of tasks based at least in part on the dependency relationship;
receive a notification message sent by the second processing apparatus, wherein the notification message indicates that a depended task of the plurality of tasks or a dependent task of the plurality of tasks has been processed; and
update a status of an event based on the notification message; and
release an identifier of the event when an updated status of the event satisfies a preset condition.

9. The apparatus according to claim 8, wherein the task description information comprises identifiers of task streams corresponding to the plurality of tasks, a first threshold is greater than a second threshold; and
the one or more processors further execute the instructions to:

allocate corresponding task streams in idle task streams to the plurality of tasks when a quantity of resources of idle task streams is greater than or equal to the first threshold;

allocate corresponding task streams in existing task streams on the second processing apparatus to the plurality of tasks when the quantity of resources of idle task streams is less than or equal to the second threshold; or allocate the corresponding task streams in the idle task streams to some of the plurality of tasks, and allocate the corresponding task streams in the existing task streams on the second processing apparatus to remaining tasks of the plurality of tasks when the quantity of resources of idle task streams is greater than the second threshold and less than the first threshold.

10. The apparatus according to claim 9, wherein the one or more processors further execute the instructions to:

select, based on a required task stream priority for a first task, a task stream whose priority is the same as the required task stream priority from the existing task streams on the second processing apparatus; and determine the selected task stream as corresponding to the first task, wherein the first task is any one of the plurality of tasks.

11. The apparatus according to claim 10, wherein the task description information comprises the identifier of the event, the event indicates a second dependency relationship between tasks corresponding to the event, the tasks corresponding to the event are two or more tasks that are located in different task streams and have the dependency relationship in the plurality of tasks, the two or more tasks comprise the dependent task and the depended task, and processing of the dependent task depends on a processing result of the depended task.

12. A processing apparatus, wherein the processing apparatus comprises:

a memory storage comprising instructions; and one or more processors in communication with the memory storage, wherein the one or more processors execute the instructions to:

receive an instruction sent by a first processing apparatus, wherein the instruction comprises a plurality of tasks and task description information of the plurality of tasks, the task description information of the plurality of tasks indicates a dependency relationship between the plurality of tasks, and that when any two tasks that have the dependency relationship, processing of one task needs to wait for a processing result of the other task;

process the plurality of tasks based on the dependency relationship between the plurality of tasks; and return a notification message to the first processing apparatus after determining that a depended task of the plurality of tasks or a dependent task of the plurality of tasks has been processed, wherein the notification message indicates that the depended task or the dependent task has been processed.

13. The apparatus according to claim 12, wherein the task description information comprises an identifier of an event, the event indicates a dependency relationship between tasks corresponding to the event, the tasks corresponding to the event are two or more tasks that are located in different task streams and have a dependency relationship in the plurality of tasks, the two or more tasks comprise the dependent task and the depended task, and processing of the dependent task depends on a processing result of the depended task.

14. The apparatus according to claim 13, wherein the one or more processors further execute the instructions to:

update a status of the event to a ready state after determining that eaeh the depended task has been processed;

determine that the dependent task is a to-be-processed task; and process the dependent task when the status of the event is the ready state.

15. The method according to claim 2, wherein the identifiers of the task streams are obtained based at least in part on a comparison between a task stream quantity of a task stream list maintained by the first processing apparatus and a preset quantity of task streams.

16. The method according to claim 2, wherein the first threshold and the second threshold are different quantities of idle streams.

17. The apparatus according to claim 9, wherein the identifiers of the task streams are obtained based at least in part on a comparison between a task stream quantity of a task stream list maintained by the first processing apparatus and a preset quantity of task streams.

* * * * *

UNITED STATES PATENT AND TRADEMARK OFFICE
CERTIFICATE OF CORRECTION

| | | |
|---|---|---|
| PATENT NO. | : 11,941,434 B2 | Page 1 of 1 |
| APPLICATION NO. | : 17/097211 | |
| DATED | : March 26, 2024 | |
| INVENTOR(S) | : Li et al. | |

It is certified that error appears in the above-identified patent and that said Letters Patent is hereby corrected as shown below:

In the Claims

In Column 24, in Claim 14, Line 27, after "that" delete "each".

Signed and Sealed this
Thirtieth Day of April, 2024

Katherine Kelly Vidal
*Director of the United States Patent and Trademark Office*